(12) United States Patent
Moos

(10) Patent No.: US 9,669,893 B2
(45) Date of Patent: Jun. 6, 2017

(54) HINGED HANDGRIP PAD

(71) Applicant: Joseph Moos, Evanston, IL (US)

(72) Inventor: Joseph Moos, Evanston, IL (US)

( * ) Notice: Subject to any disclaimer, the term of this patent is extended or adjusted under 35 U.S.C. 154(b) by 155 days.

(21) Appl. No.: 14/630,987

(22) Filed: Feb. 25, 2015

(65) Prior Publication Data

US 2015/0166140 A1 Jun. 18, 2015

Related U.S. Application Data

(60) Provisional application No. 61/949,519, filed on Mar. 7, 2014.

(51) Int. Cl.
 *B62K 21/26* (2006.01)

(52) U.S. Cl.
 CPC ......... *B62K 21/26* (2013.01); *Y10T 29/49826* (2015.01); *Y10T 74/20828* (2015.01)

(58) Field of Classification Search
 CPC ..... B62K 21/26; A63B 22/0605; A63B 60/14; B25G 1/01; B25G 1/102; B62J 11/00; B62J 23/00; B62H 3/02; Y10T 74/20828; Y10T 29/49826
 See application file for complete search history.

(56) References Cited

U.S. PATENT DOCUMENTS

| | | | |
|---|---|---|---|
| 421,277 A * | 2/1890 | Horton & Levison | B62K 21/26 74/551.9 |
| 421,936 A * | 2/1890 | Horton & Levison | B62K 21/26 74/512 |
| 572,226 A | 12/1896 | Spiegel | |
| 3,179,435 A * | 4/1965 | Miller | A63C 11/222 280/821 |
| 3,875,819 A * | 4/1975 | Haffner | F16P 3/00 74/489 |
| 3,937,629 A | 2/1976 | Hamasaka | |
| 6,858,286 B1 | 2/2005 | Simm et al. | |
| 7,543,725 B2 * | 6/2009 | Herzog | A01G 1/125 15/405 |
| 8,534,159 B2 | 9/2013 | Laivins et al. | |
| 8,590,201 B2 * | 11/2013 | Brixius | F41C 23/12 42/71.01 |
| 2004/0007086 A1 | 1/2004 | Cummings | |
| 2005/0126331 A1 | 6/2005 | Dal Pra | |

FOREIGN PATENT DOCUMENTS

TW DE 10214147 A1 * 11/2003 ............. B62J 29/00

* cited by examiner

*Primary Examiner* — Adam D Rogers
(74) *Attorney, Agent, or Firm* — Perry Hoffman

(57) ABSTRACT

A pivotal handgrip pad for use on a bicycle handlebar including a first section and a second section. Attached to the first section is a hook and loop fastener with a buckle to connect the pad to the handlebar. The second section includes a cushioned material and a layer of material that extends from the second section to the first section to enable the cushioned second section to rest on the handlebars in a lowered position so that a rider's hand may grip the second section and handlebars simultaneously, and a raised position where the rider is enabled to grip just the handlebars and not the pad.

20 Claims, 8 Drawing Sheets

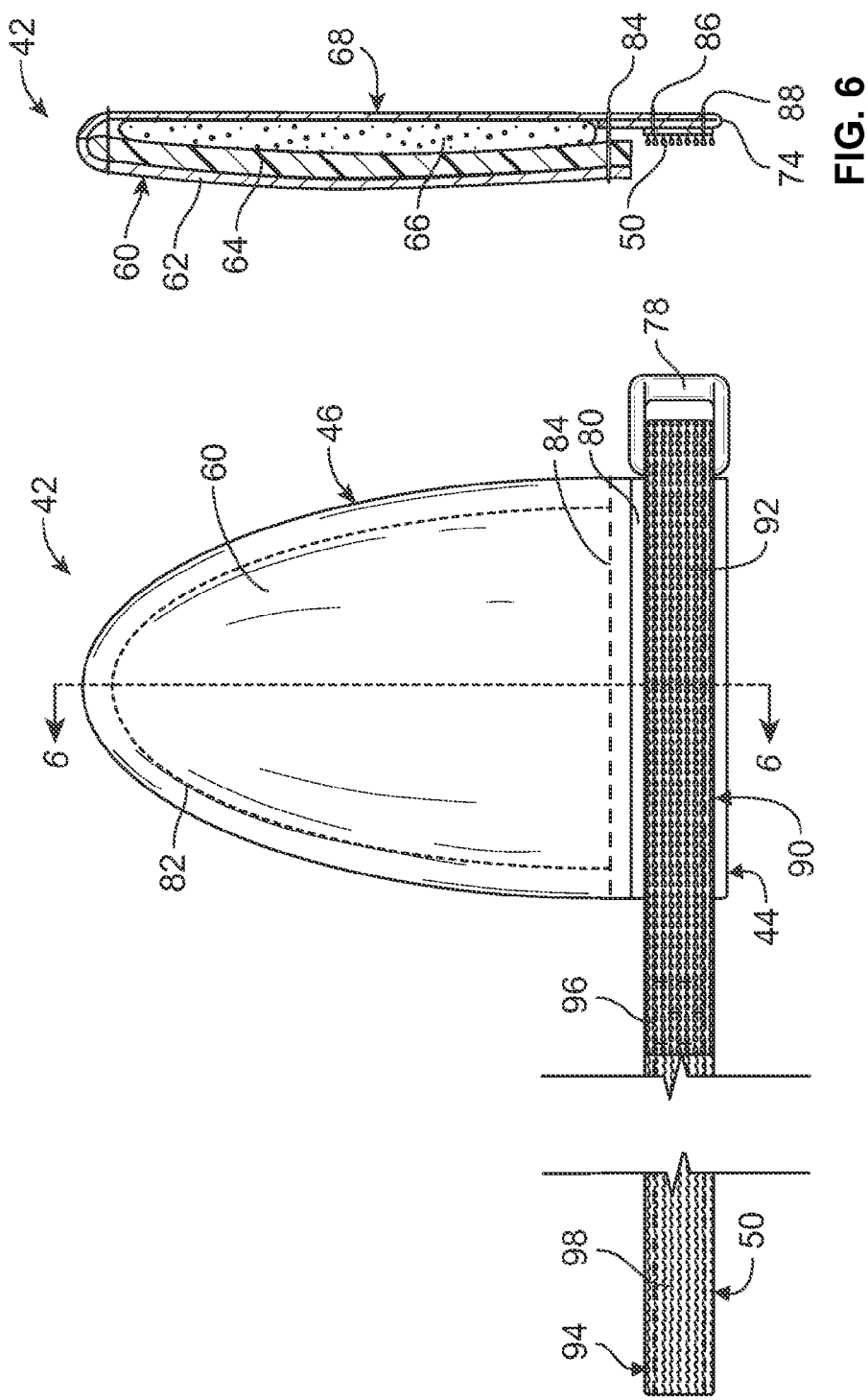

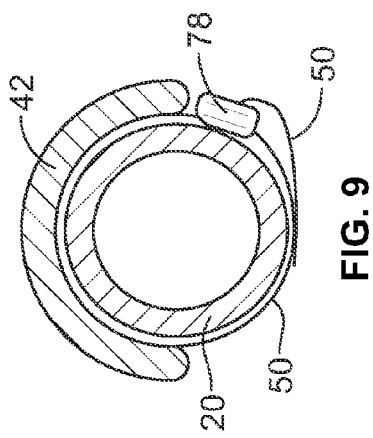
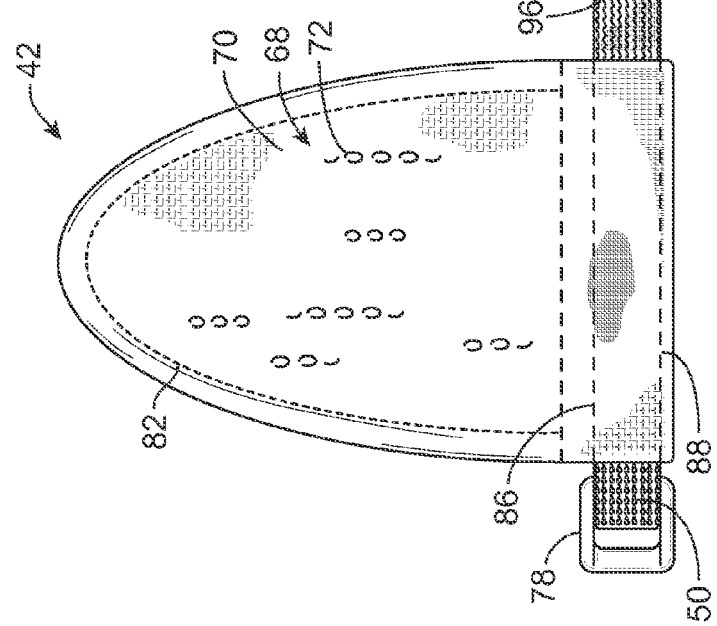
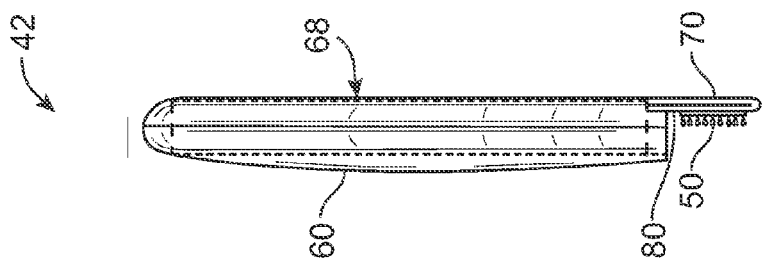

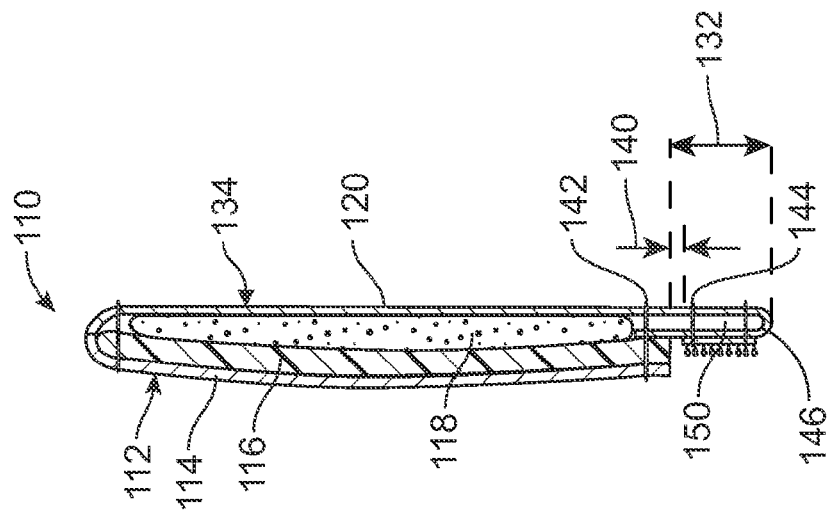
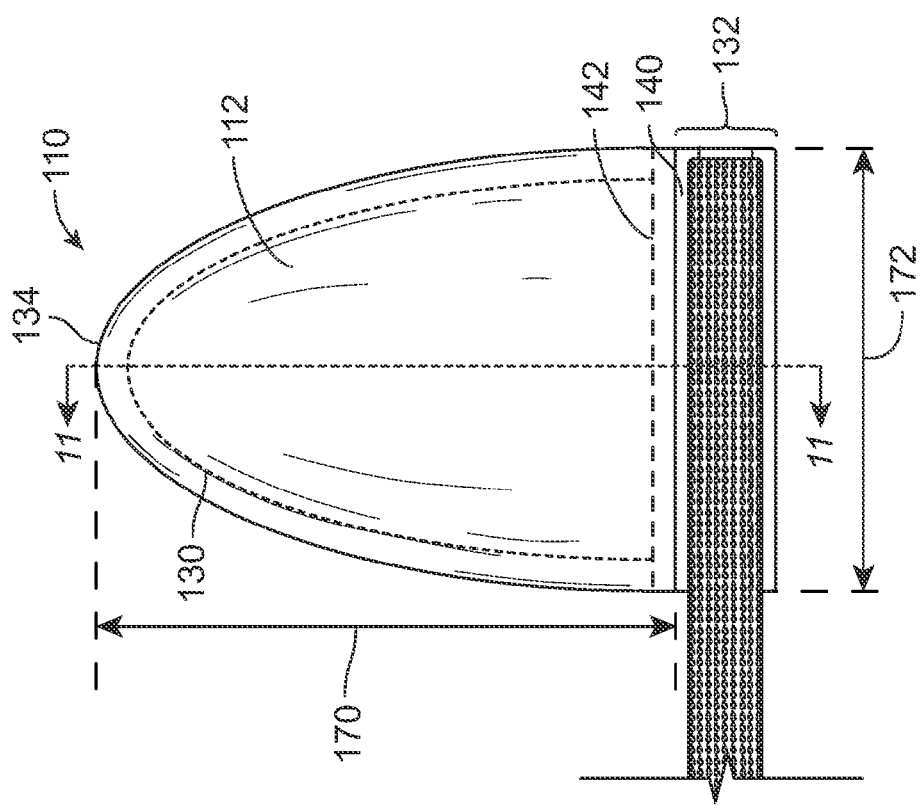
FIG. 11
FIG. 10

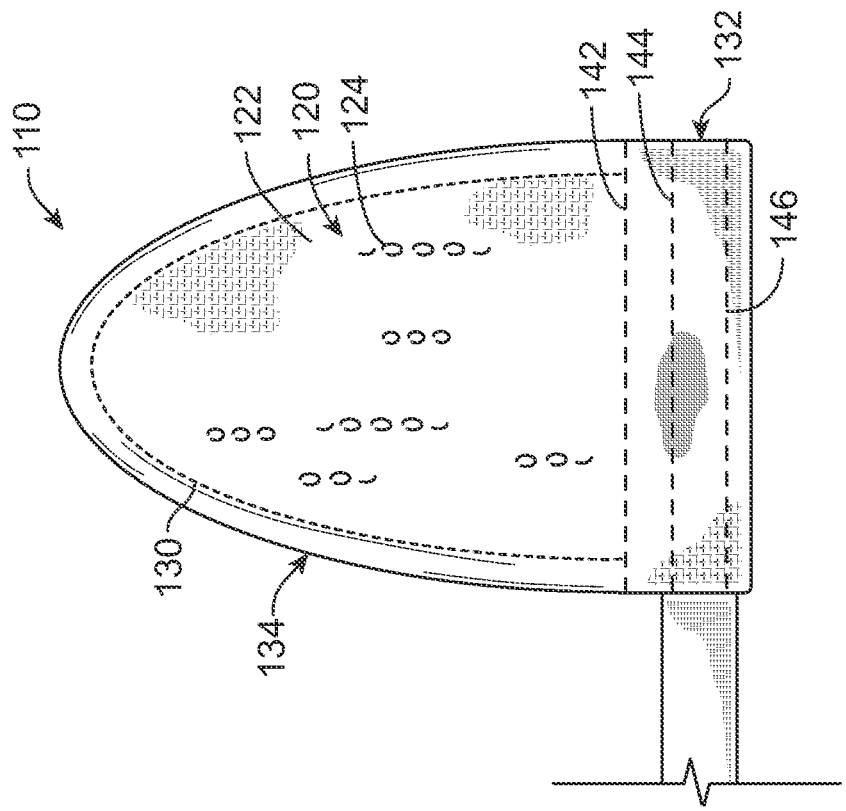
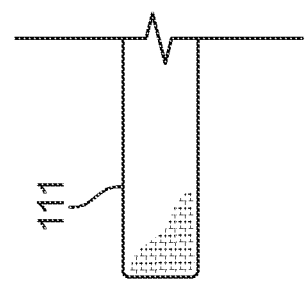
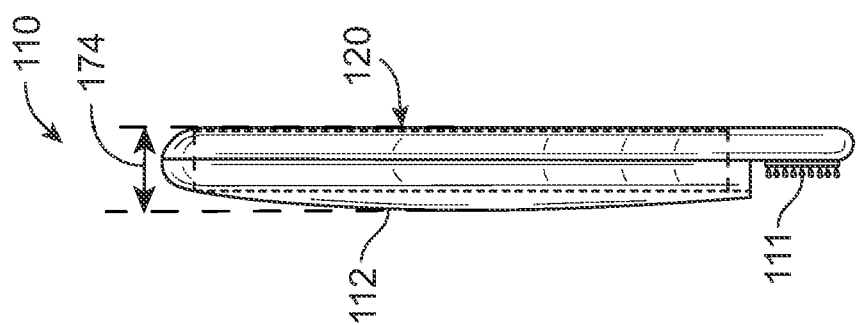
FIG. 13
FIG. 12

HINGED HANDGRIP PAD

PRIORITY CROSS-REFERENCE TO RELATED APPLICATION

This application claims priority pursuant to 35 U.S.C. 119(e) or 120 from U.S. Provisional Applications No. 61/949,519, filed Mar. 7, 2014.

FIELD OF THE INVENTION

The present invention generally to a handgrip pad apparatus, and more particularly, to a handgrip pad apparatus that is hinged to allow a user, such as a bicycle rider, to use the handgrip pad against the usual wrapped bicycle handlebar or grip to relieve muscle tension and fatigue in the hands and arms, or to easily and quickly pivot the handgrip pad away from the handlebar and allow the rider to place his hand directly on the wrapped handlebar or grip.

BACKGROUND OF THE INVENTION

Major problems for many bicycle riders are believed to be fatigue and possible injury to nerve regions of the riders' hands/arms because of the riders' constant grip of solid or near solid bicycle handlebars. Apparently, irritation and injury of the median and ulnar nerves are the common injury experienced. Similar problems exist when a user grips certain vibratory tools and equipment, such as a jackhammer, for an extended period.

Efforts developed in the past for addressing these problems with bicycle use include the common practice of adding conventional cushioned grips or a padded tape to the handlebar and/or having the rider use padded gloves. Typically, the tape is wrapped around the handlebar to provide some cushioning for the rider's hands because the tape includes cushioning cork or a gel. Padded gloves also provide some cushion for the hands or predetermined portions of the hands. However, the problems of fatigue and possible injury continue to plague mountain bike and long distance bicycle riders and users of certain equipment.

The invention discussed below in connection with the described preferred embodiment addresses these and other deficiencies of the prior art. The features and advantages of the present invention will be explained in, or become apparent from, the following summary and description of the preferred embodiment considered together with the accompanying drawings.

SUMMARY OF THE INVENTION

In accordance with the present invention, an advantageous method and apparatus are provided in the form of a pivotal handgrip pad that is easy to attach to a handle, such as a bicycle handlebar, for example, where the pad provides injury and fatigue protection to a rider's hand and arm. The pad is attached to a handlebar by connecting a first section of the pad to the handlebar, such that a rider may grip the pad and the handlebar simultaneously or the rider may pivot, tilt or lift a cushioned second section of the pad upward easily and quickly while continuing to ride. Pivoting the second section of the pad upward allows the handlebar to be gripped more directly for greater bicycle control and/or for a change of hand position. When the rider again wishes to use the pad, the second section may be easily and quickly pivoted downward to rest on the handlebar without requiring a user to stop the bicycle. The pad may include a detachable fastener for easy application to and removal from the handlebar, or if a more permanent attachment is desired should theft be a concern, a tamperproof connector may be used. The pivotal pad is simple to make, easy to use, inexpensive and yet, structurally robust.

Briefly summarized, the invention relates to a pivotal handgrip pad for use on a handle including a first section to enable the pad to be connected to the handle, and a second cushioned section connected to the first section and movable relative to the first section between a lowered position wherein the cushioned section rests on the handle to enable a user to grip the second section and the handle simultaneously and a raised position wherein the cushioned section is rotatable away from the handle to enable the user to grip the handle and not the pad.

The invention also relates to a method for making a pivotal pad for a handle, the steps of the method including forming a first section for attaching the pad to the handle, and forming a second section sharing a layer of material with the first section, the second section being movable relative to the first section between a lowered position wherein the second section is enabled to rest on the handle and a raised position wherein the second section is enabled to rotate away from the handle.

BRIEF DESCRIPTION OF THE DRAWINGS

For the purpose of facilitating an understanding of the invention, the accompanying drawings and detailed description illustrate preferred and other embodiments thereof, from which the invention, its structures, its construction and operation, its processes, and many related advantages may be readily understood and appreciated.

FIG. 5 is a top plan view of the handgrip pad illustrated in FIGS. 1-4.

FIG. 6 is a diagrammatic sectional view taken along line 6-6 of FIG. 5.

FIG. 7 is a side elevation view of the handgrip pad illustrated in FIGS. 1-6.

FIG. 8 is a bottom plan view of the handgrip pad illustrated in FIGS. 1-7.

FIG. 9 is a diagrammatic sectional view of the handgrip pad mounted to a handlebar taken along line 9-9 of FIG. 1.

FIG. 10 is a top plan view of another embodiment of a handgrip pad.

FIG. 11 is a diagrammatic sectional view taken along line 11-11 of FIG. 10.

FIG. 12 is a side elevation view of the handgrip pad illustrated in FIGS. 10 and 11.

FIG. 13 is a bottom plan view of the handgrip pad illustrated in FIGS. 10-12.

DETAILED DESCRIPTION OF THE EMBODIMENTS

The following description is provided to enable those skilled in the art to make and use the described preferred embodiment set forth in the best mode contemplated for carrying out the invention. Various modifications, equivalents, variations, and alternatives, however, will remain readily apparent to those skilled in the art. Any and all such modifications, variations, equivalents, and alternatives, such as the other embodiment described in detail here, are intended to fall within the spirit and scope of the present invention.

Figure 1:
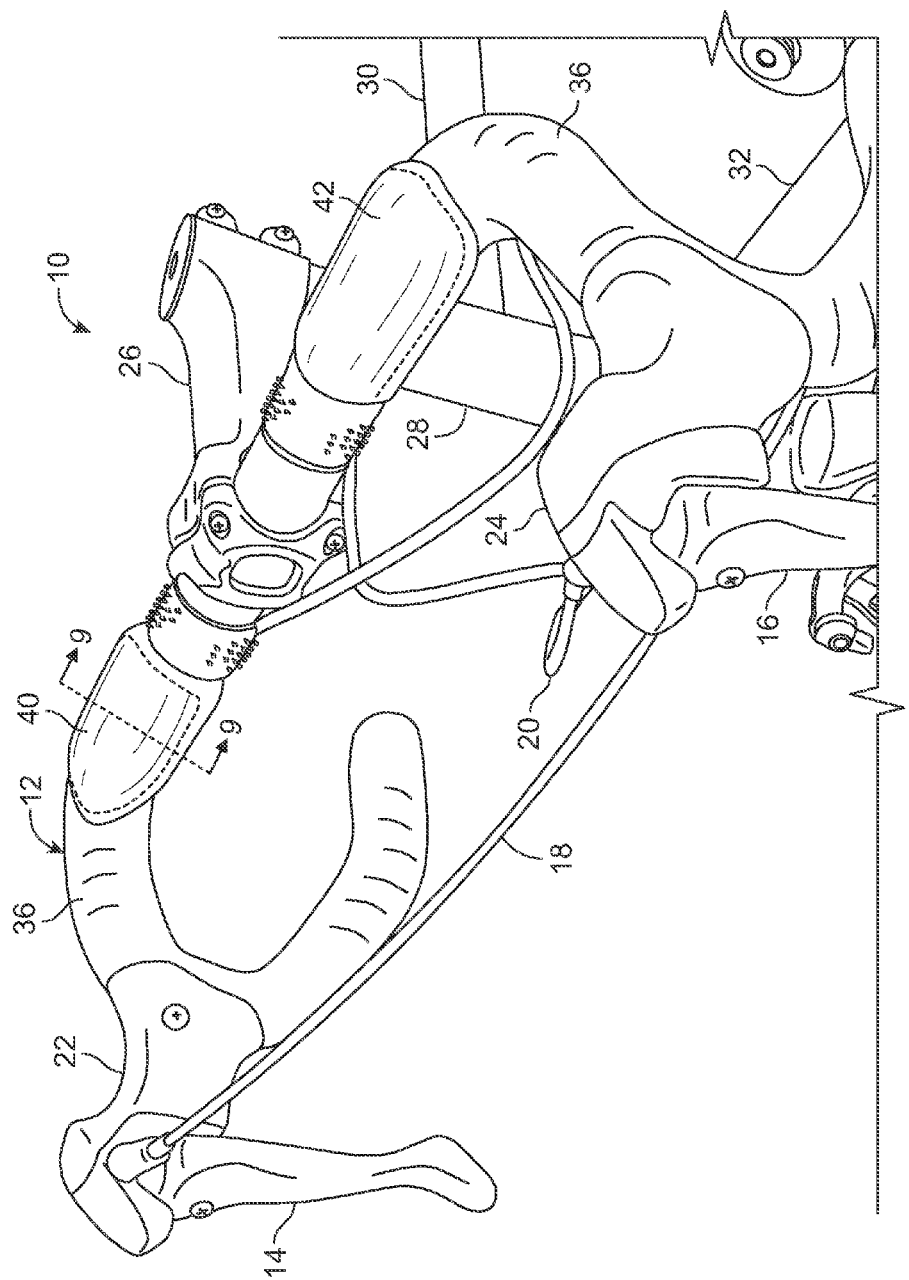
FIG. 1 is an isometric view of two handgrip pads of the present invention mounted to a conventional "drop" handlebar of a bicycle where the pads are each in a lowered position.
Figure 2:
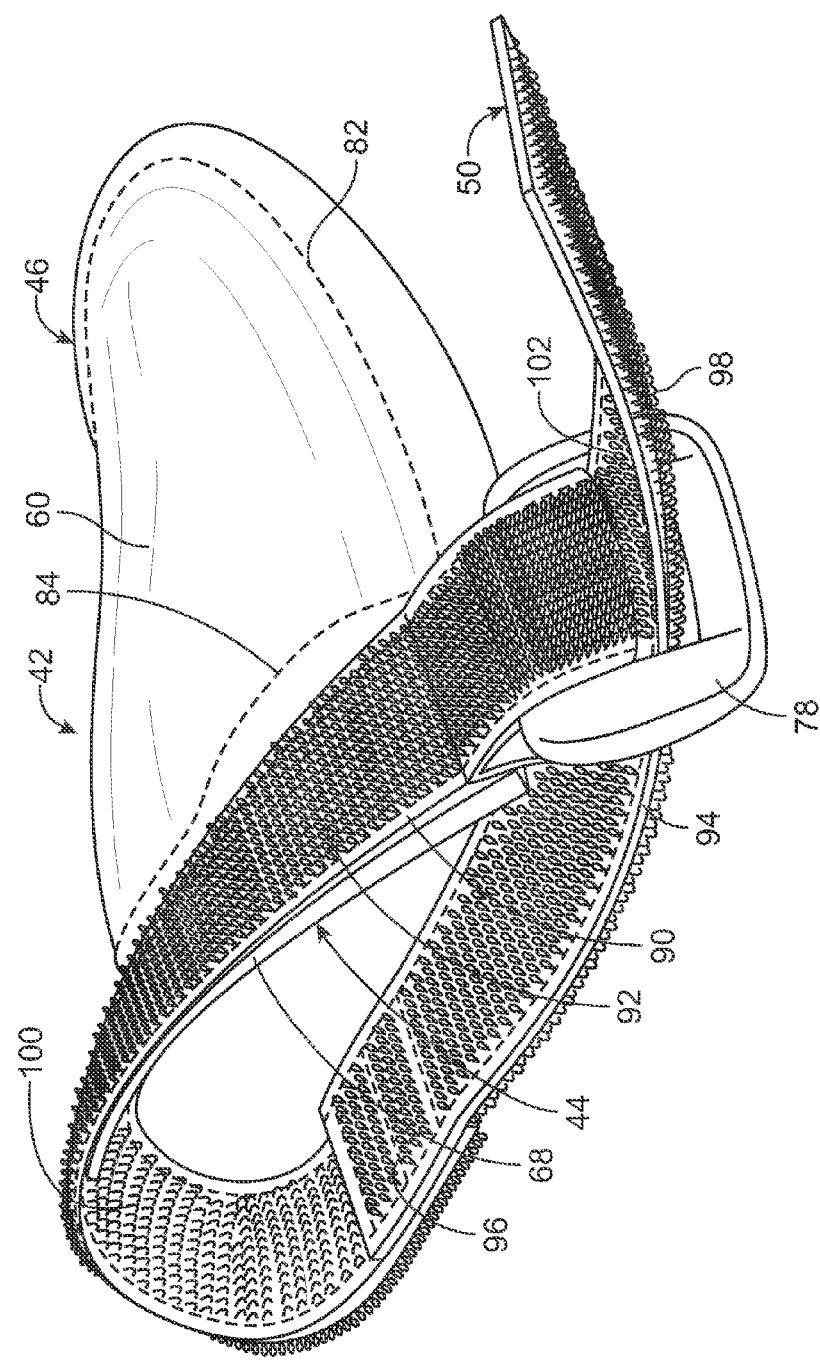
FIG. 2 is an enlarged isometric view of a preferred embodiment of the handgrip pad with a hook and loop fastener strip and a buckle.

Referring to FIG. 1, there is illustrated an upper, forward portion of a bicycle 10 showing a conventional drop handlebar 12, a pair of brake levers 14, 16, a pair of brake cables 18, 20, brake hoods 22, 24, a handlebar stem 26, a head tube 28, a cross or top tube 30 and a down tube 32. Wrapped around the handlebar is a padded tape 36, typically cushioned with cork or a polymer. Connected to the handlebar on either side of the handlebar stem 26 are two handgrip pad apparatus 40, 42 of the present invention. While the handlebars shown and known as a conventional "drop" handlebar according to Wikipedia, in the alternative, the pad apparatus may be used on all other types of handlebars, such as those referred to as "standard", "track", "ergo", "randonneur", "drop-in", "bullhorn", "bullmoose", "flat", "riser" (typically used on mountain bikes), "triathlon", "BMX", "upright or north road", "porteur", "cruiser", "condorino", "whatton", "touring or trekking", "ape hangers", and "recumbent".

It is noted that some handlebars use end grips instead of tape. Nevertheless, the handgrip pad may be use on top of such end grips. It is understood that the pad may also be used on any future handlebar design, as well as on machines having handles or handgrips for gripping by a user, such as those found on jackhammers, for example.

Referring now to FIGS. 1-4, the handgrip pad 42 is illustrated in more detail. The pad 42 (as well as the identical pad 40) has a generally parabolic shape in plan view (see FIGS. 5 and 8) and includes a first section 44 and a second section 46. The first section 44 enables the pad to be connected to a handle, such as the handlebar 12, and the second section 46 provides a cushion and is also movable relative to the first section 44 between a lowered position, shown in FIGS. 1 and 3, and a raised position, shown in FIG. 4. When the pad is in the lowered position, a user may easily grip both the pad and the handlebar to help relieve stress and prevent injury from vibrations and shocks. When the pad is in the raised position, a user is able to grip just the handlebar for greater control or as a change of hand location.

Referring now to FIGS. 2 and 5-9, the handgrip pad 42 is illustrated in additional detail. The second section 46 of the handgrip pad 42 may include multiple layers, and an attachment structure or fastener 50 is connected to the first section 44. In the preferred embodiment, the pad 42 (as well as the pad 40) includes an upper layer 60 that may include spandex or elastane 62, FIG. 6, a synthetic fiber known for elasticity, bonded to a layer of neoprene 64. (It is noted that the layers may not be drawn to scale but are enlarged for clarity.) Spandex is a polyurethane polyurea copolymer often sold under the trademark LYCRA. Neoprene or polychloroprene is a family of synthetic rubbers that are produced by polymerization of chloroprene. A suitable source of bonded neoprene and spandex is available from Perfectex Plus LLC, of Huntington Beach, Calif. The bonded neoprene and spandex may be two to four mm thick.

The pads 40, 42 may also include a middle layer 66 which may be a polymer gel or a viscoelastic urethane polymer. A gel is a solid, jelly-like material. By weight, a gel is mostly liquid but it behaves like a solid due to a three-dimensional cross-linked network within the liquid. Viscoelastic material also exhibits properties of both liquids and solids with a relaxation time of two seconds. Because of the behavior of viscoelastic material it is often desirable in shock and vibration applications. A suitable viscoelastic material may be obtained from Sorbothane, Inc. of Kent, Ohio. A gel source is Advanced Antivibration Components of New Hyde Park, N.Y.

The pads 40, 42 also include a shared lower layer of material 68, which extends along and connects the first and second sections 44, 46 of the pads and may be formed of a skid resistant material, such as waterproof-coated polyester fabric 70, FIG. 8, printed with a raised pattern 72 for the skid resistance. The term polyester is most commonly used to refer to polyethylene terephthalate, and fabrics woven from polyester thread are used in numerous apparel and home furnishing products. Suitable fabrics may be obtained from Eastex Products, Inc. of Holbrook, Mass.

In the alternative, other materials may be used for the upper layers, such as real or synthetic leather formed over the neoprene. The middle layer may include any suitable cushioning material, and the lower layer may include any suitable skid resistant material. More or less layers may be used if desired.

Figure 4:
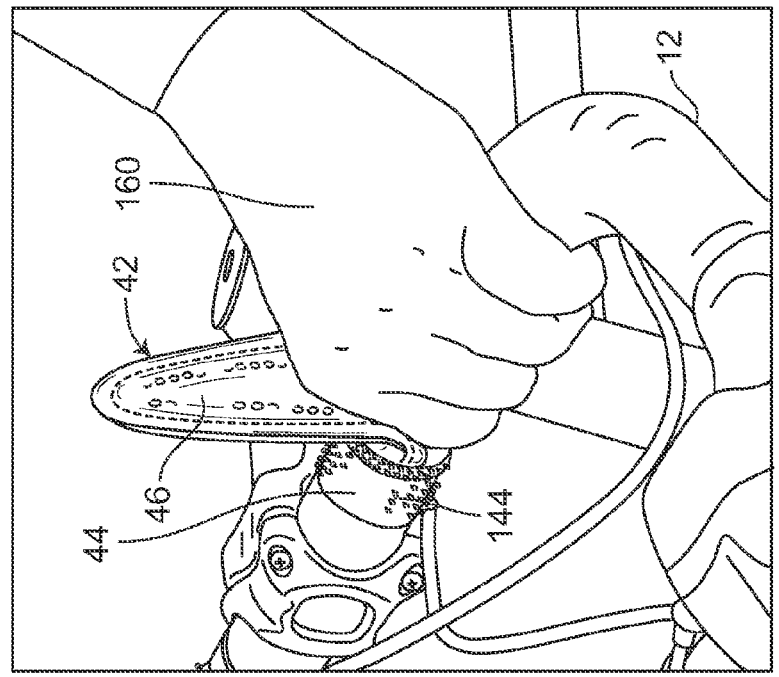
FIG. 4 is an isometric view similar to that shown in FIG. 3, where the handgrip pad is pivoted upward to a raised position allowing the rider's left hand to grip the bicycle handlebar without gripping the pad.
Figure 3:
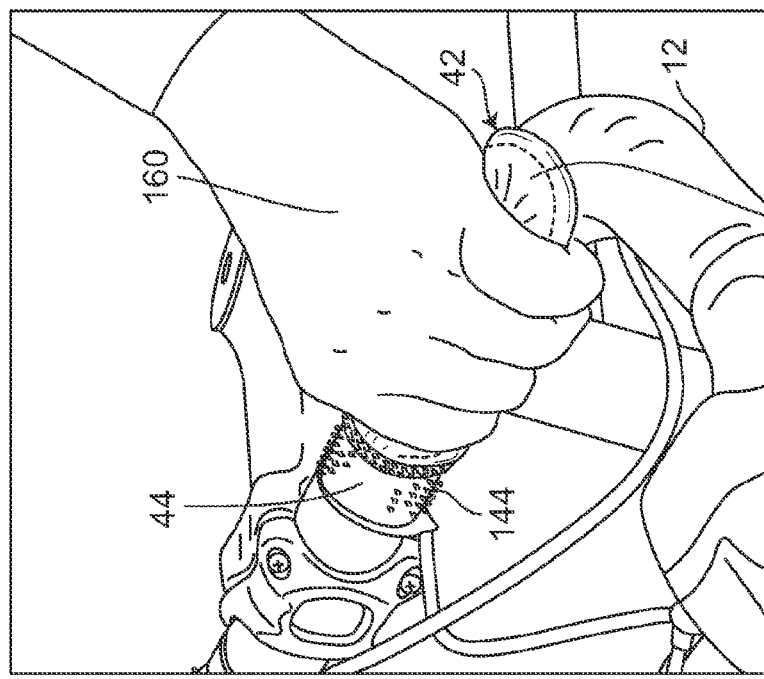
FIG. 3 is an isometric view of a rider's left hand gripping a mounted handgrip pad and the bicycle handlebar simultaneously.
Figure 14:
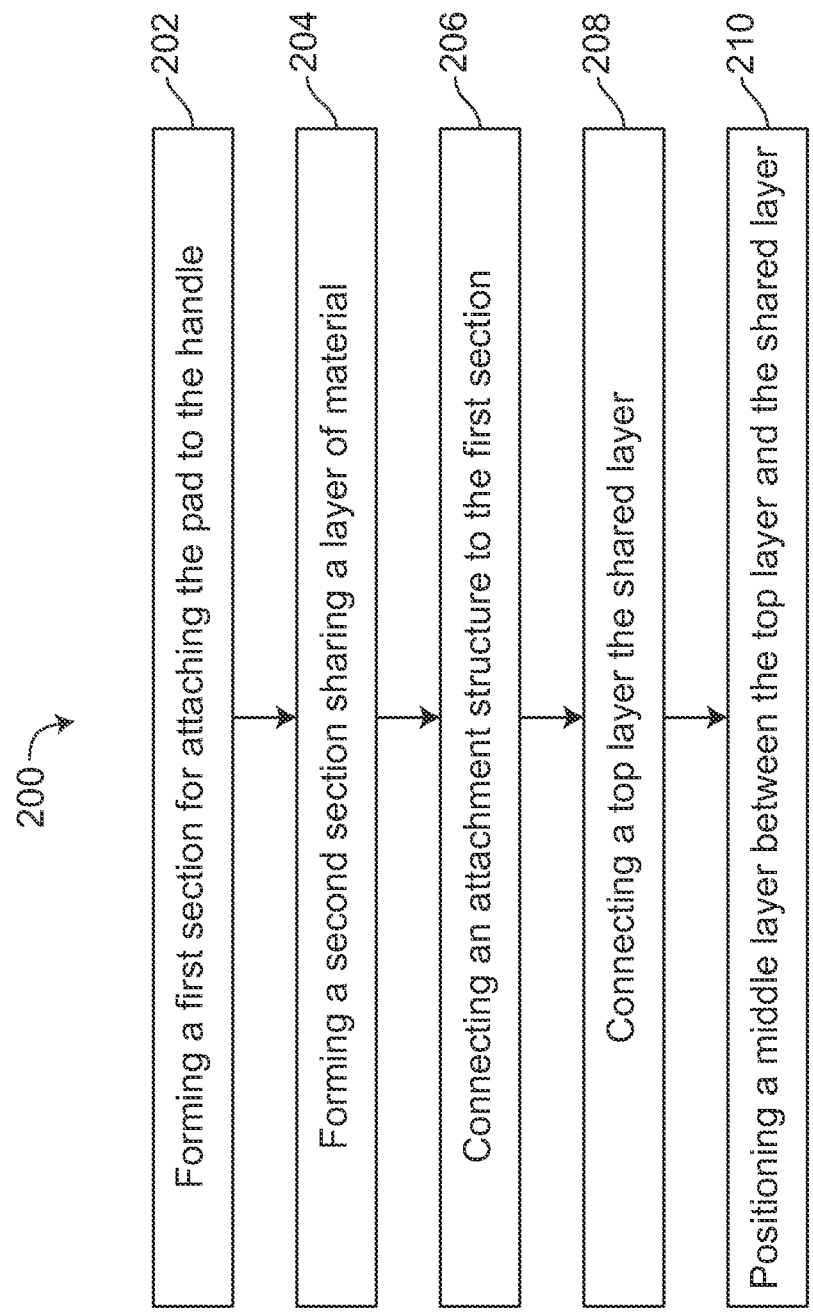
FIG. 14 is a flow diagram of a method for making a handgrip pad.

The lower layer 68 extends along both of the first and second sections 44, 46, as shown in FIG. 6, and is doubled or folded over in the first section 44 to form a base 74 for connection of the fastener 50, such as a strip of hooks and loops with a buckle 78 placed as one end. The strip of hooks and loops is often marketed under the trademark VELCRO. A gap 80 is formed between the fastener strip 50 and the second section 46 with the upper, middle and lower layers 60, 66, 68. The gap 80 forms a hinge to facilitate the pivotal movement of the second section 46 relative to the first section 44 between the lowered and raised positions. The benefit of having the pad is that when the pad is in the lowered position, a user may easily grip both the pad and the handlebar simultaneously to help relieve stress and prevent injury from vibrations and shocks as shown in FIG. 3. When the pad is in the raised position, a user is able to grip just the handlebar for greater control or as a change of hand location as shown in FIG. 4.

The upper, middle and lower layers 60, 66, 68 may be stitched together, such as by the generally parabolic stitch line 82, FIG. 5, which terminates at a horizontal stitch line 84. The fastener strip 50 may be connected to the base 74 by two additional stitch lines 86, 88, FIGS. 6 and 8. In the alternative, an adhesive may be used to connect the upper, middle and lower layers and an adhesive may be used to connect the fastener strip to the base.

The fastener strip 50 may be formed of two portions, one portion being the reverse of the other to enable the hooks and loops to be engaged. A first portion 90, FIGS. 2 and 5, of the fastener 50 circles around the buckle 78 and has an outside surface 92 with a multitude of loops. About midway along the fastener 50 a second portion 94 is connected, such as by stitching 96, and is identical to the first portion 90 except that it is upside down relative to the first portion. The result is that an outside surface 98 of the second portion 94 has a multitude of hooks. An inside surface 100 of the first portion 90 has a multitude of hooks while an inside surface 102 of the second portion 94 has a multitude of hoops. The second portion 94 of the fastener 50 with the outside surface 98 of hooks is enabled to pass through the buckle 78 and when turned around (or rotated 180 degrees) and extended in the opposite direction results in the hooks of the outside surface 98 of the second portion 94 being in position to contact and engage the loops of the outside surface 92 of the first portion 90. In this manner, the fastener strip 50 is enabled to encircle around the handlebar 12 as shown in FIG. 9, and connect the pad to the handlebar.

Using the buckle 78 enables the fastener 50 to be pulled tightly around the handlebar 12 before the hooks and loops engage each other. The hook and loop fastener 50 allows the handgrip pad to be easily and quickly attached to the handlebar as well as detach from the handlebar, using such fasteners or similar constrictive devices or methodology for easy and quick attachment to the handlebar. As mentioned, the pads 40, 42 are identical to each other and the various portions are numbered the same. In the alternative, the first and second portions of the fastener may be reversed so that the outside surface 92 has hooks and the outside surface 98 has loops. In a further alternative, the first and second portions of the fastener may be connected with an adhesive. In a still further alternative, the strip and buckle fastener may be formed to closely resemble a small belt with a buckle and tongue at one end and a series of holes near the other end.

It may now be appreciated that the pads 40, 42 are simply constructed, easy to make, inexpensive, easy to use and robust structurally. The pads are quickly and easily connected to the handlebars of a bike and the second sections may be flipped upward and downward even when the bike is being ridden. When the pads are down, a rider may grip the pads and the handlebars simultaneously.

Referring now to FIGS. 10-13, another handgrip pad 110 is illustrated. The handgrip pad 110 also has a generally parabolic shape in plan view as shown in FIGS. 10 and 13, and includes multiple layers. An attachment structure or fastener 111 is connected. The pad 110, like the pads 40, 42, includes an upper layer 112 that may be formed of spandex 114 bonded to neoprene 116. The neoprene and spandex may be two to four mm thick. The pad 110 may also include a middle layer 118 which may be a polymer gel or a viscoelastic urethane polymer. The pad 110 may also include a lower layer 120 which may be formed of a skid resistant material, such as waterproof-coated polyester fabric 122, FIG. 11, printed with a raised pattern 124.

The upper and lower layers 112, 120 may be attached by an adhesive or, as shown, by stitching 130 around the handgrip pad so as to capture the middle layer 118. The handgrip pad 110 includes a first section 132 for attachment to a handle and a second section 134 connected with the first section but hinged so as to be pivotal relative to the first section. The lower layer 120 may extend along both the first and second sections 132, 134. The first section 132 with the attachment structure or fastener 111 enables the pad to be connected to a handle, such as the handlebar 12, and the second section 134 provides a cushion and is also rotatable relative to the first section 132 between the lowered position and the raised position just like that shown in FIGS. 2 and 3. When the pad 110 is in the lowered position, a user may easily grip both the pad and the handlebar to help relieve stress and prevent injury from vibrations and shocks. When the pad is in the raised position, a user is able to grip just the handlebar for greater control or for a change of hand location.

A hinge or gap region 140 is formed approximately between a stitch line 142, FIGS. 10, 11 and 13, and a stitch line 144. The first section 132 of the pad 110 may be formed is by having the lower layer fabric 120 looped around to create a base for the fastener 111, such as a hook and loop fastener strip to be used to connect the pad to a handlebar. The hook and loop fastener 111 may be connected to the first section 132 by stitch lines 144 and 146, FIGS. 11 and 13, or by an adhesive.

The looped lower layer fabric 120 at the first section 132 may also create a space or passageway 150, FIG. 11, such that a second attachment structure or fastener, such as a zip or cable tie, may be inserted for a more permanent attachment of the pad 110 to the handlebar to deter theft. Zip ties are generally considered to be tamperproof fasteners. Even with a zip tie the pad 110 may still be pivoted between the lowered position and the raised position where the second section 134 is spaced away from the handlebar 12. The pivot takes place at the hinge region 140.

In the alternative, another attachment structure may be used as long as the other attachment structure allows the pad to be attached to the handlebar so that the pad may be pivoted out of the way of a rider's hand 160, FIGS. 3 and 4. For example, the hook and loop fastener may be attached to the upper layer, or the upper layer may form a passageway to receive a zip tie, if one is used. Or, a separate layer of material attached to the pad may be used to connect the hook and loop fastener and/or receive the zip tie.

In operation, the handgrip pads 40, 42, 110 are movable between the two positions as shown in FIGS. 3 and 4. On a bicycle, for example, a rider may attach a handgrip pad to the handlebar to each side of the handlebar stem 26. The first section of each pad is connected to the handlebar by placing an end of the hook and loop fastener into the buckle, reversing direction and tightening the hook and loop fastener around the handlebar before pressing the hooks and loops together. This allows the second section of each pad to freely pivot between the lowered and raised positions. The parabolic shape and the elastic nature of the upper neoprene/spandex layer 60 biases the second section 46/134 of the pad to the lower position when the pad is "at rest."

To take advantage of the vibration damping and/or stress relief cushioning advantages offered by the handgrip pads, the rider places his hand over the handgrip pads, as shown in FIG. 3. If the rider wishes to have better control of the bicycle or just to change to a different grip, the handgrip pads (or one of them) may be pivoted upward to the position shown in FIG. 4, and the rider may grip the handlebar directly. Pivoting the pads between the lowered and raised positions is quick and easy and may be done with the flick of a thumb or finger.

The dimensions of the handgrip pad are generally large enough to provide comfort for a hand. The size of the pad may vary for riders with larger or smaller hands or riders who wish more or less cushioning. It has been found that the dimensions of a pad for general use results in a second section of the pad being about 7.8 cm in length along the distance 170, FIG. 10, about 6 cm in width along the distance 172, and about 13 mm thick as measured along the distance 174, FIG. 12. Again, these dimensions may vary as a function of the size of the rider's hands and/or the cushioning desired.

It is noted that throughout this description, words such as "upper," "middle," and "lower," as well as similar locational or positional terms, refer to portions or elements of the handgrip pad as it is viewed in the drawings relative to other portions of the handgrip.

It is now apparent that the pads described in detail here have the advantage of allowing its use to cushion a rider's hand/arm when in the lowered position resting on the handlebars and easily pivoted upward to the raised position allowing the rider to grip the handlebars directly. Pivoting the pad may be easily and quickly accomplished even while riding the bicycle.

The present invention also includes a method 200 for making a pivotal pad for a handle, the steps of the method including forming a first section for attaching the pad to the handle 202, and forming a second section sharing a layer of material with the first section 204, the second section being movable relative to the first section between a lowered position wherein the second section is enabled to rest on the handle, and a raised position wherein the second section is enabled to rotate away from the handle. The method may also include the steps of connecting an attachment structure to the first section 206, the attachment structure including a buckle and a hoop and loop fastener, connecting a top layer to the shared layer of the second section 208, and positioning a middle layer between the top layer and the shared layer 210.

The handgrip pads disclosed in detail above have the important advantages of reducing injury and fatigue, of being easy to operate, and yet the pads are simple to make, easy to attach, producible at a reasonable cost and structurally robust. From the foregoing, it can be seen that there has been provided features for an improved handgrip pad apparatus and a disclosure of a method for making the pad. While a preferred embodiment of the present invention has been shown and described in detail, it will be obvious to those skilled in the art that changes and modifications may be made as shown without departing from the invention in its broader aspects. Therefore, the aim is to cover all such changes and modifications as fall within the true spirit and scope of the invention. The matters set forth in the foregoing description and accompanying drawings are offered by way of illustrations only and not as limitations. The actual scope of the invention is to be defined by the subsequent claims when viewed in their proper perspective based on the prior art.

What is claimed is:

1. A pivotal handgrip pad for use on a handle comprising:
   a first section to enable the pad to be connected to the handle; and
   a second cushioned section connected to the first section and movable relative to the first section between a lowered position wherein the second cushioned section rests on the handle to enable a user to grip the second cushioned section and the handle simultaneously, and a raised position wherein the second cushioned section is rotatable away from the handle to enable the user to grip the handle and not the pad, the second cushioned section comprising an upper layer and a lower layer attached together, and having the upper layer comprising a generally parabolic shape material bonded with a synthetic rubber material for biasing the second cushioned section to the lowered position.

2. The pivotal pad of claim 1, wherein:
   the lower layer includes a skid resistant material.

3. The pivotal pad of claim 2, wherein:
   the skid resistant material includes a synthetic polymer having a raised pattern.

4. The pivotal pad of claim 1, wherein:
   the first section includes an attachment structure.

5. The pivotal pad of claim 4, wherein:
   the attachment structure includes a buckle.

6. The pivotal pad of claim 5, wherein:
   the attachment structure includes a hook and loop fastener.

7. The pivotal pad of claim 4, wherein:
   the attachment structure at the first section includes a constrictive device for being pulled around the handle.

8. The pivotal pad of claim 1, wherein:
   the parabolic shape material comprises a copolymer material; and
   the synthetic rubber material is from a polychloroprene family of synthetic rubbers.

9. The pivotal pad of claim 1, wherein:
   the parabolic shape material comprises a spandex material; and
   the synthetic rubber material comprises a neoprene material.

10. A pivotal handgrip pad for use on a handle comprising:
    a first section to enable the pad to be connected to the handle;
    an attachment structure having a buckle and a hoop and loop fastener connected to the first section; and
    a second cushioned section connected to the first section, the second cushioned section includes an upper layer that includes a cushioning material wherein the upper layer includes spandex bonded to neoprene and a lower layer that includes a skid resistant material that extends along the first and second sections, the upper and lower layers being attached together including a middle layer of cushioning material positioned between the upper and lower layers of the second section, wherein the attachment structure is connected to the lower layer in the first section with the second cushioned section movable relative to the first section between a lowered position wherein the second cushioned section rests on the handle to enable a user to grip the second cushioned section and the handle simultaneously, and a raised position wherein the second cushioned section is rotatable away from the handle to enable the user to grip the handle and not the pad.

11. The pivotal pad of claim 10, wherein:
    the skid resistant material includes a polyester synthetic polymer having a raised pattern.

12. The pivotal pad of claim 10, wherein:
    the upper layer of the second cushioned section comprises the spandex including a generally parabolic shape material bonded to the neoprene for biasing the second cushioned section to the lowered position.

13. A method for making a pivotal pad for a handle, the steps of the method comprising:
    forming a first section for attaching the pad to the handle; and
    forming a second cushioned section connected with the first section, the second cushioned section being movable relative to the first section between a lowered position wherein the second cushioned section is enabled to rest on the handle, and a raised position wherein the second cushioned section is enabled to rotate away from the handle, the second cushioned section comprising an upper layer and a lower layer attached together, and having the upper layer comprising a generally parabolic shape material bonded with a synthetic rubber material for biasing the second cushioned section to the lowered position.

14. The method of claim 13, including the step of:
connecting an attachment structure to the first section, the attachment structure including a constrictive device at the first section pulled around the handle.

15. The method of claim 13, wherein with the second cushioned section being moved to the lowered position enables a user to grip the second cushioned section and the handle simultaneously.

16. The method of claim 13, wherein with the second cushioned section being moved to the raised position enables a user to grip the handle and not the pad.

17. The method of claim 13, including the steps of:
providing a copolymer material for the parabolic shape material; and
providing a polychloroprene synthetic rubber as the synthetic rubber material.

18. The method of claim 13, including the steps of:
providing the parabolic shape material with a spandex material; and
providing the synthetic rubber material with a neoprene material.

19. The method of claim 13, including the step of:
providing the lower layer with a skid resistant material.

20. The method of claim 19, wherein:
the skid resistant material is provided with a synthetic polymer having a raised pattern.

* * * * *